United States Patent
Guo

(10) Patent No.: US 11,380,037 B2
(45) Date of Patent: Jul. 5, 2022

(54) METHOD AND APPARATUS FOR GENERATING VIRTUAL OPERATING OBJECT, STORAGE MEDIUM, AND ELECTRONIC DEVICE

(71) Applicant: TENCENT TECHNOLOGY (SHENZHEN) COMPANY LIMITED, Shenzhen (CN)

(72) Inventor: Chang Guo, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 0 days.

(21) Appl. No.: 17/107,885

(22) Filed: Nov. 30, 2020

(65) Prior Publication Data

US 2021/0134036 A1    May 6, 2021

Related U.S. Application Data

(63) Continuation of application No. PCT/CN2020/115778, filed on Sep. 17, 2020.

(30) Foreign Application Priority Data

Oct. 30, 2019   (CN) .......................... 201911046873.5

(51) Int. Cl.
   *G06T 11/60*         (2006.01)
   *A63F 13/60*         (2014.01)
   (Continued)

(52) U.S. Cl.
   CPC .............. *G06T 11/60* (2013.01); *A63F 13/53* (2014.09); *A63F 13/60* (2014.09); *G06T 11/001* (2013.01); *G06F 16/44* (2019.01)

(58) Field of Classification Search
   CPC ............... G06F 2111/18; G06F 3/0481; G06F 3/04817; G06F 9/4443; G06F 3/04847;
   (Continued)

(56) References Cited

U.S. PATENT DOCUMENTS

| 2012/0086783 A1* | 4/2012 | Sareen | G06T 19/00 348/47 |
| 2018/0107864 A1 | 4/2018 | Meekins et al. | |

(Continued)

FOREIGN PATENT DOCUMENTS

| CN | 1797474 A | 7/2006 |
| CN | 103926997 A | 7/2014 |

(Continued)

OTHER PUBLICATIONS

The World Intellectual Property Organization (WIPO) International Search Report for PCT/CN2020/115778 dated Dec. 16, 2020 7 Pages (including translation).

(Continued)

*Primary Examiner* — Todd Buttram
(74) *Attorney, Agent, or Firm* — Anova Law Group, PLLC

(57) ABSTRACT

A method for generating a virtual operating object is provided for an electronic device. The method includes obtaining a target portrait picture on a configuration interface of a target application on the electronic device; obtaining a first picture region of the target portrait picture where a first part presents and a first part feature of the first part; determining a target part matching the first picture region in a pre-established feature image library, the target part being a part of a to-be-generated target virtual operating object in the target application; determining a target feature parameter matching the first part feature in a value range of a target part feature of the target part pre-recorded in the feature image library; and generating the target part in the target application according to the target feature parameter.

20 Claims, 10 Drawing Sheets

(51) Int. Cl.
*A63F 13/53* (2014.01)
*G06T 11/00* (2006.01)
*G06F 16/44* (2019.01)

(58) Field of Classification Search
CPC .... G06F 11/3664; G06F 3/012; G06F 3/0304; G06F 3/011–015; G06K 9/00664–00704; G06T 19/00; G06T 17/00; G06T 7/00; G06T 19/006; G06T 2215/16; H04N 5/272; H04N 2201/3245; A63F 13/10
See application file for complete search history.

(56) References Cited

U.S. PATENT DOCUMENTS

| | | | |
|---|---|---|---|
| 2019/0266796 A1* | 8/2019 | Comer | G06T 19/20 |
| 2020/0286288 A1 | 9/2020 | Deng | |
| 2021/0134036 A1* | 5/2021 | Guo | G06T 11/60 |

FOREIGN PATENT DOCUMENTS

| | | |
|---|---|---|
| CN | 108154116 A | 6/2018 |
| CN | 108245890 A | 7/2018 |
| CN | 108245893 A | 7/2018 |
| CN | 108629339 A | 10/2018 |
| CN | 109087376 A | 12/2018 |
| CN | 109670385 A | 4/2019 |
| CN | 109857311 A | 6/2019 |
| CN | 109876450 A | 6/2019 |
| CN | 110755847 A | 2/2020 |

OTHER PUBLICATIONS

The State Intellectual Property Office of the People's Republic of China (SIPO) Office Action 1 for 201911046873.5 Jun. 18, 2020 12 Pages (including translation).

* cited by examiner

Return

System preset face type

Creation based on facial recognition

Creation based on manual customization

METHOD AND APPARATUS FOR GENERATING VIRTUAL OPERATING OBJECT, STORAGE MEDIUM, AND ELECTRONIC DEVICE

RELATED APPLICATIONS

This application is a continuation application of PCT Patent Application No. PCT/CN2020/115778, filed on Sep. 17, 2020, which claims priority to Chinese Patent Application No. 201911046873.5, entitled "METHOD AND APPARATUS FOR GENERATING VIRTUAL OPERATING OBJECT, STORAGE MEDIUM, AND ELECTRONIC DEVICE" and filed with the National Intellectual Property Administration, PRC on Oct. 30, 2019, content of all of which is incorporated by reference in its entirety.

FIELD OF THE TECHNOLOGY

This application relates to the field of computers and, more specifically, to a method and an apparatus for generating a virtual operating object, a storage medium, and an electronic device.

BACKGROUND

Currently, virtual characters are used in many scenarios. For example, a virtual game character is used in a game scene for game playing. In most scenarios, designers set default appearances of virtual characters at the beginning. If all users use the appearances of the virtual characters initially set by the designers, the appearances are monotonous.

In the related art, a user can manually adjust some parameters to change an appearance of a virtual character. However, operating steps are complex in manual adjustment of virtual character appearances. The disclosed methods and systems are directed to solve one or more problems set forth above and other problems.

SUMMARY

According to embodiments provided in the present disclosure, a method and an apparatus for generating a virtual operating object, a storage medium, and an electronic device are provided.

According to an aspect of the embodiments of the present disclosure, a method for generating a virtual operating object is provided for an electronic device. The method includes obtaining a target portrait picture on a configuration interface of a target application on the electronic device; obtaining a first picture region of the target portrait picture where a first part presents and a first part feature of the first part; determining a target part matching the first picture region in a pre-established feature image library, the target part being a part of a to-be-generated target virtual operating object in the target application; determining a target feature parameter matching the first part feature in a value range of a target part feature of the target part pre-recorded in the feature image library; and generating the target part in the target application according to the target feature parameter.

According to another aspect of the embodiments of the present disclosure, an electronic device for generating a virtual operating object is provided. The electronic device includes a memory storing computer program instructions, and a processor coupled to the memory. When executing the computer program instructions, the processor configured to perform: obtaining a target portrait picture on a configuration interface of a target application on the electronic device; obtaining a first picture region of the target portrait picture where a first part presents and a first part feature of the first part; determining a target part matching the first picture region in a pre-established feature image library, the target part being a part of a to-be-generated target virtual operating object in the target application; determining a target feature parameter matching the first part feature in a value range of a target part feature of the target part pre-recorded in the feature image library; and generating the target part in the target application according to the target feature parameter.

According to still another aspect of the embodiments of the present disclosure, a non-transitory computer-readable storage medium is provided. The non-transitory computer-readable storage medium stores computer program instructions executable by at least one processor to perform: obtaining a target portrait picture on a configuration interface of a target application on an electronic device; obtaining a first picture region of the target portrait picture where a first part presents and a first part feature of the first part; determining a target part matching the first picture region in a pre-established feature image library, the target part being a part of a to-be-generated target virtual operating object in the target application; determining a target feature parameter matching the first part feature in a value range of a target part feature of the target part pre-recorded in the feature image library; and generating the target part in the target application according to the target feature parameter.

Details of one or more embodiments of the present disclosure are provided in the following accompanying drawings and descriptions. Based on the specification, the accompanying drawings, and the claims of the present disclosure, other features, objectives, and advantages of the present disclosure can become more obvious.

BRIEF DESCRIPTION OF THE DRAWINGS

To describe the technical solutions of the embodiments of the present disclosure more clearly, the following briefly describes the accompanying drawings for describing the embodiments. Apparently, the accompanying drawings in the following description show only some embodiments of the present disclosure, and a person of ordinary skill in the art may still derive other drawings according to these accompanying drawings without creative efforts.

DETAILED DESCRIPTION

To make a person skilled in the art better understand solutions of the present disclosure, certain embodiments of the present disclosure are described below with reference to the accompanying drawings. Apparently, the described embodiments are merely some rather than all of the embodiments of the present disclosure. Other embodiments obtained by a person of ordinary skill in the art based on the embodiments of the present disclosure without creative efforts shall fall within the protection scope of the present disclosure.

The terms such as "first" and "second" in the specification, claims, and accompanying drawings of the present disclosure that are intended to distinguish between similar objects rather than describe a particular sequence or a chronological order. It is to be understood that the data termed in such a way are interchangeable in proper circumstances, so that the embodiments of the present disclosure described herein can be implemented in other orders than the order illustrated or described herein. In addition, the terms "include" and "have" and any other variants are intended to cover the non-exclusive inclusion. For example, a process, method, system, product, or device that includes a list of steps or units is not necessarily limited to those expressly listed steps or units, but may include other steps or units not expressly listed or inherent to such a process, method, product, or device.

Technical terms involved in the embodiments of the present disclosure include the followings.

(1) Mobile terminal: A mobile terminal generally refers to handheld portable game devices, which include but are not limited to mobile phones.

(2) Creating a character appearance: This refers to a computer-readable instruction of defining the appearance of a game character or another character. A game with a massive number of fictive settings may have features such as race, gender, and other types.

(3) Facial recognition: The facial recognition is also referred to as face recognition, face perception, facial perception, or the like. The facial recognition uses a recognition information obtaining apparatus to obtain a face image of a recognized object. A computer system, after obtaining the image, compares the image with images in a database to complete the recognition process.

Figure 1:
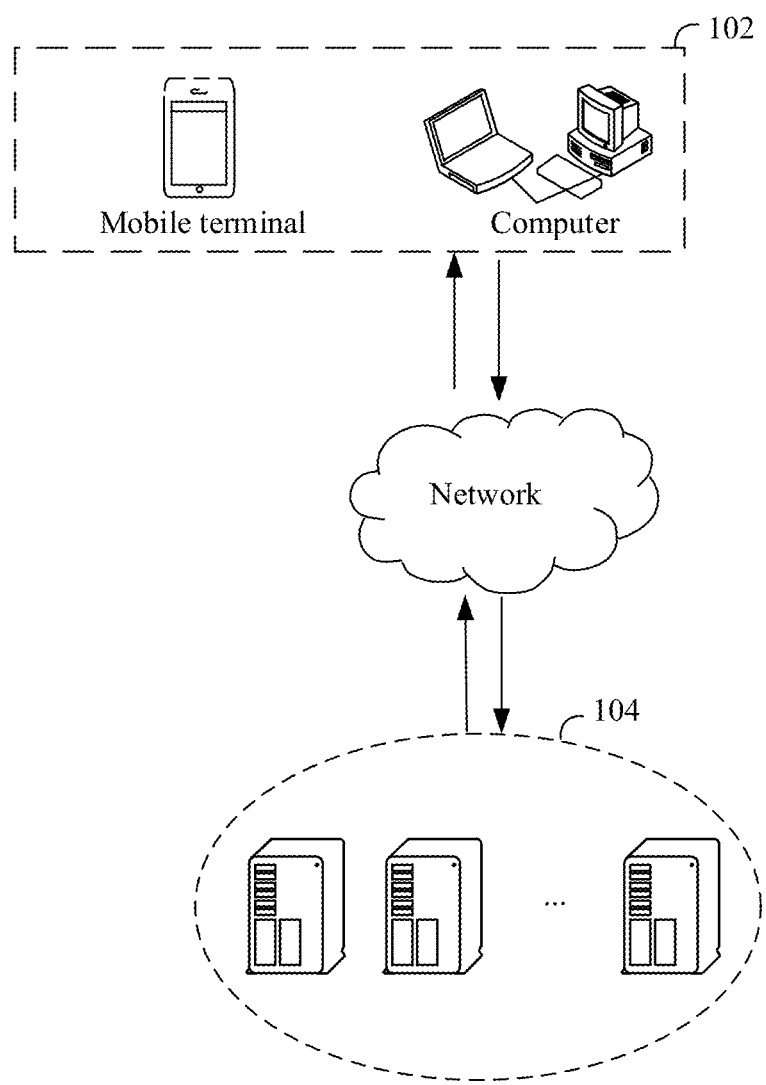
FIG. 1 is a schematic diagram of an application environment of a method for generating a virtual operating object according to an embodiment of the present disclosure.

According to one aspect of the embodiments of the present disclosure, a method for generating a virtual operating object is provided. In an embodiment, the method for generating a virtual operating object may be applied to, but not limited to, an application environment shown in FIG. 1. As shown in FIG. 1, a target client (for example, Android, iOS, or Web) of a target application is run on a terminal device 102. The target client may be a game application, a social media application, a video editing application, etc. Through the target client, a target portrait picture is obtained on a configuration interface of the target game application.

The target portrait picture is transmitted to a server 104 through a network. The server 104 may be a backend server of the target client. After receiving the target portrait picture, the server 104 obtains a first picture region of the target portrait picture where a first part presents and a first part feature of the first part according to the target portrait picture; determines a target part matching the first picture region in a pre-established feature image library, the target part being a part of a to-be-generated target virtual operating object in the target game application; and determines, in a value range of a target part feature of the target part pre-recorded in the feature image library, a target feature parameter, which matches the first part feature, of the target part feature. Further, the server 104 transmits the target feature parameter to the mobile device 102 through a network. The mobile device 102 generates the target part in the target game application according to the target feature parameter. The foregoing description is merely an example, and is not limited in this embodiment of the present disclosure.

In an embodiment, the target portrait picture is obtained on the configuration interface of the terminal device 102, and then the terminal device 102 obtains the first picture region of the first part in the target portrait picture and the first part feature of the first part according to the target portrait picture; determines a target part matching the first picture region in a pre-established feature image library, the target part being a part of a to-be-generated target virtual operating object in the target game application; and determines, in the value range of the target part feature of the target part pre-recorded in the feature image library, the target feature parameter, which matches the first part feature, of the target part feature; and generates the target part in the target game application according to the target feature parameter. The foregoing description is merely an example, and is not intended to be limiting.

In an embodiment, the target portrait picture may be a picture directly taken by a user through a mobile device (for example, a mobile phone), or the target portrait picture may be a picture saved locally in the mobile device.

In an embodiment, the terminal device may be a terminal device provided with a target client, which may include: a mobile phone (for example, an Android phone or an iOS phone), a notebook computer, a tablet computer, a palmtop computer, a mobile Internet device (MID), a PAD, a desktop computer, and the like. The network may include a wired network and a wireless network. The wired network may include: a local area network, a metropolitan area network, and a wide area network. The wireless network may include: Bluetooth, Wi-Fi, and other networks implementing wireless communication. The server may be an independent server, or may be a cluster server including a plurality of servers. The foregoing description is merely an example, and is not limited herein.

Figure 2:
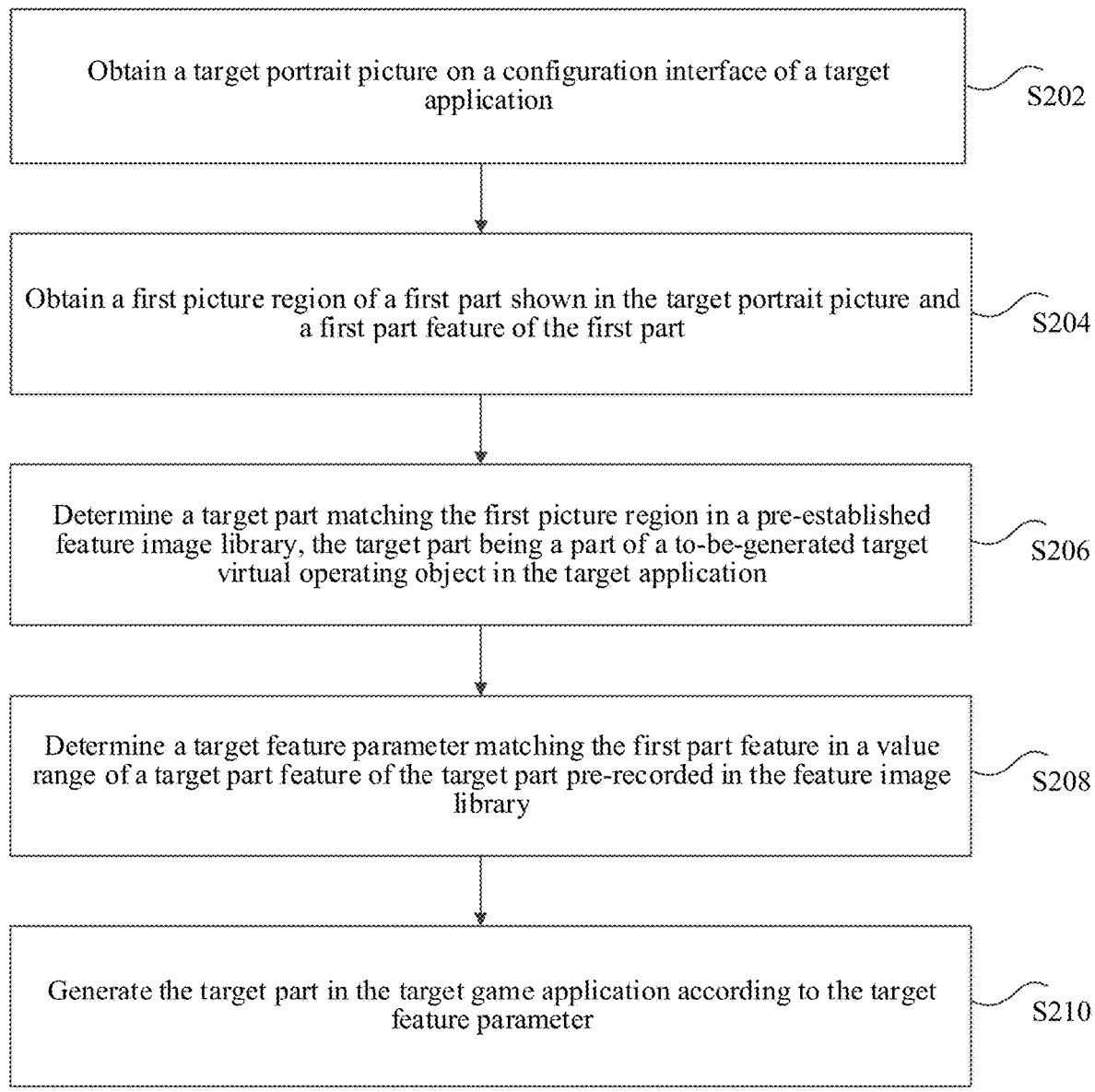
FIG. 2 is a schematic flowchart of a method for generating a virtual operating object according to an embodiment of the present disclosure.

In an embodiment, the method may be performed by a server, a terminal device, or a server and a terminal device jointly. In one embodiment, an example in which the method is performed by a terminal device (for example, the terminal device 102) is used for description. As shown in FIG. 2, the method for generating a virtual operating object may include the followings.

S202: Obtain a target portrait picture on a configuration interface of a target application.

S204: Obtain a first picture region of the target portrait picture where a first part presents and a first part feature of the first part according to the target portrait picture.

S206: Determine a target part matching the first picture region in a pre-established feature image library, the target part being a part of a to-be-generated target virtual operating object in the target application.

S208: Determine a target feature parameter matching the first part feature in a value range of a target part feature of the target part pre-recorded in the feature image library.

S210: Generate the target part in the target application according to the target feature parameter.

In an embodiment, the target application may be a target game application. In other embodiments, the target application may be other applications, other than the game application, in which virtual objects need to be generated.

In an embodiment, the method for generating a virtual operating object includes setting a game character appearance in a game scene through a client.

For example, after entering a target game, a user may set, on a configuration interface of the target game, a game character appearance of the user in the game. The user may select a game character appearance provided in a system of the game, but game character appearances provided in the system may have a high repetitive rate. Alternatively, the user may manually set a favorite game character appearance.

In an embodiment, the user may obtain a target portrait picture on the configuration interface of the target game application, and then obtain a first picture region of the target portrait picture where a first part presents (for example, eyes, a nose, eyebrows, a mouth, and ears) and a first part feature of the first part according to the obtained target portrait picture, and determine a target part matching the first picture region in a pre-established feature image library, the target part being a part of a to-be-generated target virtual operating object in the target game application, a target part feature of the target part matching the first part feature of the first part. A target feature parameter of the first part feature can be determined through a value range of the target feature of the target part. The target part is generated in the target game application according to the target feature parameter, and further a game character appearance of the target virtual operating object can be determined according to the target part.

In one embodiment, a target portrait picture is obtained on a configuration interface of a target game application; a first part of the target portrait picture, a first picture region of the first part, and a first part feature of the first part are obtained; a target part matching the first picture region is determined in a feature image library; a target feature parameter matching the first part feature is determined according to a value range of a target part feature of the target part in the feature image library; and finally, the target part is generated in the target game application according to the target feature parameter. With this method, a target part in a target game application can be determined through a part of a face picture. Because the target part is a part of a game character appearance, the technical effect of quickly generating different game character appearance is achieved, thereby resolving the technical problems in the related art that either only fixed game character appearance is provided or character appearance can be set only by cumbersome manual adjustment, benefiting the heterogeneous of game character appearances.

The method for generating a virtual operating object in one embodiment is described with reference to FIG. 2.

In S202, the target portrait picture is obtained on the configuration interface of the target game application.

In an embodiment, the target game application may be any game application in which a game character appearance of a user can be created, which is not limited herein.

The target portrait picture may be understood as a type of workable-picture, which may be worked on for various purposes like a raw material. The target portrait picture may be a local picture uploaded by a user (for example, a player), or a face image of a user which is directly taken by the user through a terminal device (for example, a mobile phone). For the workable-picture uploaded by the user, the terminal device or a server may check the specifications of the workable-picture, to check whether the workable-picture conforms to preset basic criteria. If the picture uploaded by the user does not conform to the criteria, the user needs to upload workable-picture again. It can be understood that the foregoing description is merely an example, and is not limited in one embodiment of the present disclosure.

In S204, the first picture region of the first part in the target portrait picture (that is, the first picture region of the target portrait picture where the first part present) and the first part feature of the first part are obtained according to the target portrait picture.

The target portrait picture may include one or more picture regions. Different picture regions correspond to different parts. Different parts correspond to different features. The first part may include one or more parts. For example, the first part may include eyes, eyebrows, a nose, or may include eyes, eyebrows, a nose, ears, a mouth, a face, or may include eyes only. The first part feature is used for representing feature data of the first part. For example, if the first part is eyes, the first part feature is feature data corresponding to the eyes in the target face picture. The foregoing description is merely an example, and is not limited herein.

In an embodiment, the first picture region of the first part and the first part feature of the first part may be obtained through an image pre-processing process, an edge detection algorithm (for example, a Canny edge detection algorithm), and other feasible manners. The first part feature may be also processed through a facial recognition algorithm. It can be understood that the foregoing description is merely an example, and is not limited in one embodiment of the present disclosure.

In S206, the target part matching the first picture region is determined in the pre-established feature image library, the target part being a part of the to-be-generated target virtual operating object in the target game application.

In an embodiment, the feature image library may be understood as a game character feature image library pre-established for game characters in the target game application by the terminal device or the server.

For example, the feature image library may be a model database (having the same function as the feature image library) established according to design requirements of the game. For example, a male database is separated from a female database. The feature image library may include a head type (ears, a nose, a mouth, eyebrows, eyes, a face contour), a skin color, a hair style, and the like. Various face parts and body parts may be further added according to different type classifications.

For examples, the feature image library includes the following basic types: a forehead, eyebrows, an entire nose, nasal wings, a nasal tip, a nasal bridge, a *glabella*, an entire mouth, mouth corners, two sides of a lower lip, the middle of the lower lip, two sides of an upper lip, the middle of the upper lip, entire eyes, lower eyelids, outer eye corners, eyelids, eye corners, a chin, a jaw, cheek bones, a hair style, a skin color, facial accessories, entire ears (for some part types, subtypes need to be created).

For the feature image library, a designer may preset a massive number of models and the feature image library may be continually updated and maintained by adding a workable-picture library later. It can be understood that the foregoing description is merely an example, and is not uniquely limited in one embodiment.

Figure 3:
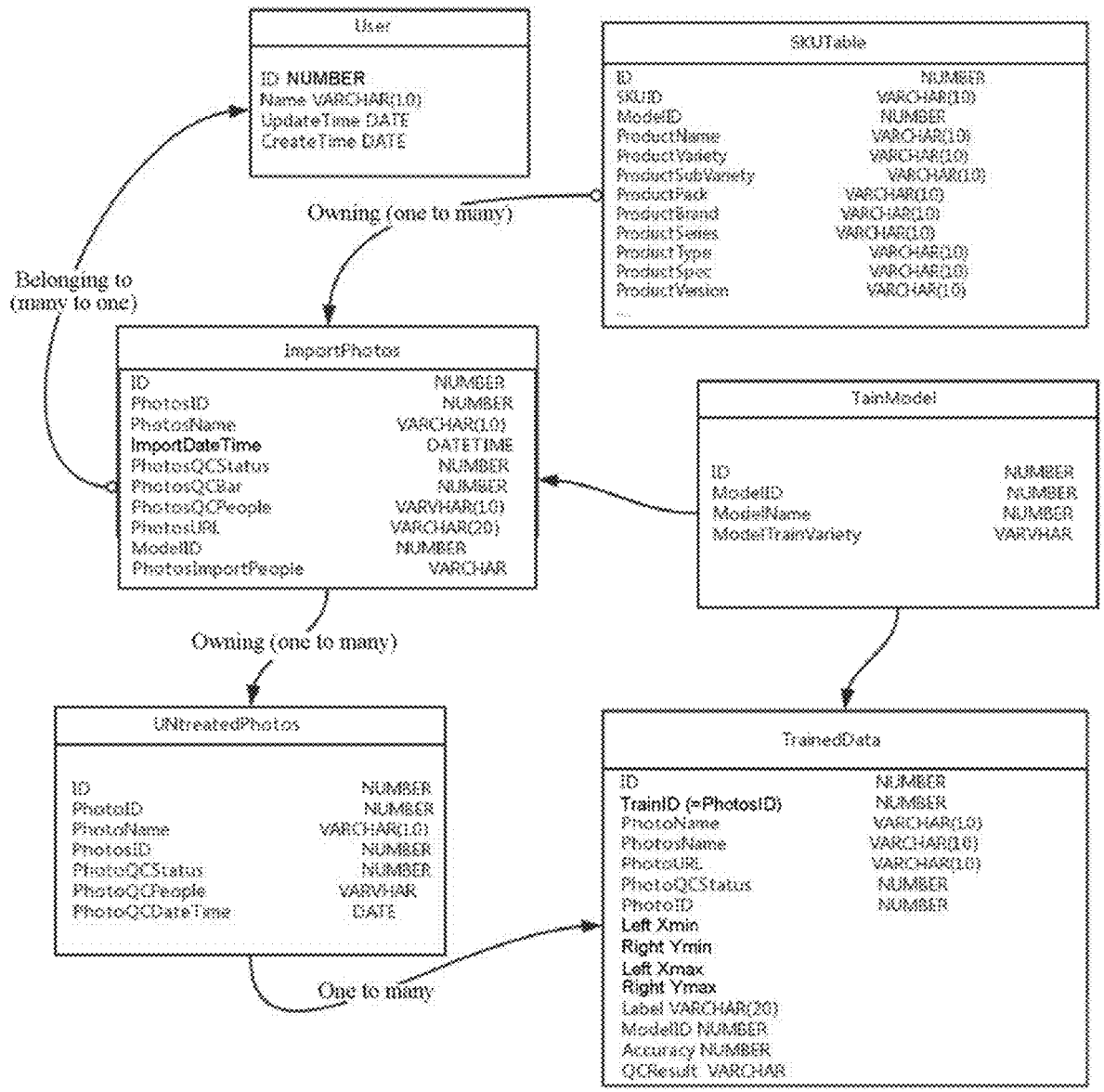
FIG. 3 is a schematic diagram of matching between a portrait picture and a feature image library according to an embodiment of the present disclosure.

In an embodiment, the first picture region may include a specific part of the target portrait picture (that is, the first picture region may be of or corresponding to a specific part of the target portrait picture). For example, the first picture region may be a region corresponding to the eyes part in the target portrait picture, or a region corresponding to the ears part. Through the feature image library, as shown in FIG. 3, the obtained first picture region is matched with model data pre-stored in the feature image library to obtain the target part matching the first picture region. The target part is pre-stored in the feature image library, and the target part is a part of the to-be-generated target virtual operating object in the target game application (for example, a game character appearance).

In an embodiment, the determining a target part matching the first picture region in a pre-established feature image library may include: obtaining similarity between each part recorded in the feature image library and the first part shown in the first picture region; and determining a part, similarity between which and the first part exceeds a preset threshold, in the feature image library as the target part.

In an embodiment, the feature image library may store picture information of each part. In a case that the first picture region is one type of picture information, similarity between picture information of the each part in the feature image library and the first part shown in the first picture region may be determined, and a part, similarity between which and the first part exceeds a preset threshold, in the feature image library is determined as the target part. Alternatively, the feature image library may further store a part feature corresponding to the each part. Similarity between the part feature of the each part in the feature image library and the first part feature of the first part may be determined, and a part corresponding to a part feature, similarity between which and the first part feature exceeds a preset threshold, in the feature image library is determined as the target part.

For example, a game character model is disassembled in an art image workable-material library (having the same function as the feature image library) to obtain a plurality of parts. The parts are managed in a classified manner, for example, managed according to the color, size, and height of eyes and eyebrows. Information (for example, eyes and eyebrows) of a key part (having the same function as the first part) is then extracted through an image recognition technology according to a face picture (having the same function as the target portrait picture) uploaded by a player. The extracted key part is matched with a plurality of parts in the art image workable-material library, and one or more results with highest similarity (having the same function as the similarity exceeding the preset threshold) are provided to the player.

In one embodiment, by determining a part, similarity between which and the first part exceeds a preset threshold, in the feature image library as the target part, the accuracy of determining the target part is improved.

In S208, the target feature parameter, which matches the first part feature, of the target part feature is determined in the value range of the target part feature of the target part pre-recorded in the feature image library.

The feature image library may include a plurality of types (having the same function as the target part), for example, an eye type, a nose type, and a mouth type. Each of the different types may further include one or more features, and each feature corresponds to a value range. For example, the eye type includes three features A1, A2, and A3 (having the same function as the target part feature). The feature A1 corresponds to a value range a1, the feature A2 corresponds to a value range a2, and the feature A3 corresponds to a value range a3. For the nose type and the mouth type, reference may be made to the eye type, and details are not described herein again.

After the target part matching the first picture region is obtained, according to the value range of the target part feature of the target part pre-recorded in the feature image library, the target feature parameter matching the first part feature is determined in the value range. That is, the target feature parameter may be a value within the value range of the target part feature.

In an embodiment, the determining, in a value range of a target part feature of the target part pre-recorded in the feature image library, a target feature parameter, which matches the first part feature, of the target part feature may include: determining, in a case that a plurality of feature values matching a feature value of the first part feature are found in the value range, a maximum value in the plurality of feature values as the target feature parameter.

In an embodiment, in a case that there are a plurality of feature values of the target part feature that match the feature value of the first part feature, a maximum value of the plurality of feature values is determined as the target feature parameter. The foregoing description is merely an example, and is not limited herein.

In one embodiment, by determining the maximum value in the plurality of feature values matching the feature value of the first part feature as the target feature parameter, the accuracy of determining the target feature parameter is improved.

In an embodiment, the determining, in a value range of a target part feature of the target part pre-recorded in the feature image library, a target feature parameter, which matches the first part feature, of the target part feature may include: determining, in a case that no feature value matching a feature value of the first part feature is found in the value range, a preset default value in the value range as the target feature parameter.

In an embodiment, in a case that there is no feature value of the target part feature matching the feature value of the first part feature, the default value (for example, a default game character appearance) is determined as the target feature parameter. The foregoing description is merely an example, and is not limited herein.

In one embodiment, in a case that no feature value matching the feature value of the first part feature is found in the value range, the preset default value in the value range is determined as the target feature parameter, to save time and time costs.

In an embodiment, the determining, in a value range of a target part feature of the target part pre-recorded in the feature image library, a target feature parameter, which matches the first part feature, of the target part feature may include: determining, in a case that the target part feature includes a plurality of part features, a feature value of each part feature in value ranges of the plurality of part features pre-recorded in the feature image library, the target feature parameter including the feature value of the each part feature.

In an embodiment, in a case that the target part includes a plurality of part features, the feature value of the each part feature of the plurality of part features needs to be determined, the target feature parameter including the feature value of the each part feature.

For example, the target part is a nose part, and the nose part includes three features: nasal wings, a nasal tip, and a nasal bridge. Value ranges of the three features: the nasal wings, the nasal tip, and the nasal bridge, need to be determined. The foregoing description is merely an example, and is not limited in one embodiment of the present disclosure.

In one embodiment, in a case that the target part includes a plurality of part features, a value range of the each part feature of the plurality of part features may be determined, to improve the accuracy of determining the target feature parameter.

In S210, the target part is generated in the target game application according to the target feature parameter.

In an embodiment, in the target game application, the target part is generated according to the target feature parameter. For example, if the target feature parameter corresponds to one feature, the feature being eyes, a corresponding eyes part is generated according to a feature parameter of the eyes. Alternatively, if the target feature parameter corresponds to a plurality of features, the plurality of features being nasal wings, a nasal tip, and a nasal bridge, a corresponding nasal wings part, a corresponding nasal tip part, and a corresponding nasal bridge part are generated according to feature parameters corresponding to the nasal wings, the nasal tip, and the nasal bridge. The foregoing description is merely an example, and is not limited herein.

In an embodiment, after the target part is generated in the target game application according to the target feature parameter, the method may further include: encapsulating and combining, in a case that the target part includes a plurality of parts and the plurality of parts are all parts that are required for generating the target virtual operating object, the plurality of parts to obtain the target virtual operating object.

Specifically, in a case that the target part includes a plurality of parts and the plurality of parts included in the target part form all parts that are required for generating the target virtual operating object, the plurality of parts included in the target part may be encapsulated and combined to generate the target virtual operating object.

For example, in a game scene, parts of a game character appearance may include a face, a body, and four limbs. Using the face as an example for description, if the target part includes the face and the face includes sub-parts such as a forehead, eyebrows, an entire nose, nasal wings, a nasal tip, a nasal bridge, a *glabella*, an entire mouth, mouth corners, two sides of a lower lip, the middle of the lower lip, two sides of an upper lip, the middle of the upper lip, entire eyes, lower eyelids, outer eye corners, eyelids, eye corners, a chin, a jaw, cheek bones, a hair style, a skin color, facial accessories, and entire ears. Such sub-parts are encapsulated and combined to form the face. In the same way, sub-parts of the body included in the target part are encapsulated and combined to form the body, and sub-parts of the four limbs included in the target part are encapsulated and combined to form the four limbs. The face, the body, and the four limbs are then encapsulated and combined to generate the game character appearance (having the same function as the target virtual operating object).

In an embodiment, the method further includes: encapsulating and combining the generated target part and a collaborative part to obtain the target virtual operating object in a case that the target part is a partial part used for generating the target virtual operating object.

The partial part indicates that the target part is some parts among all parts that are required for generating the target virtual operating object. That is, the target part cannot generate the target virtual operating object independently, but needs to be combined with another part (that is, the collaborative part) to generate the target virtual operating object jointly. It can be understood that the partial part may be one part or a plurality of parts. That is, the target part may be one part or a plurality of parts. The term "plurality of" means at least two.

The collaborative part is a part used for forming the target virtual operating object together with the target part. In an embodiment, the collaborative part may be a part at a default position in the target application, or a part generated according to a feature parameter inputted by a target account.

In an embodiment, if the target part includes a plurality of parts, but the plurality of parts cannot form all parts that are required for generating the target virtual operating object, the plurality of parts and the collaborative part other than the plurality of parts are encapsulated and combined to generate the target virtual operating object. The collaborative part is a necessary part for generating the target virtual operating object other than the plurality of parts. The collaborative part may be set as a default part in the target game application, or the collaborative part may be set through a manual input of a user corresponding to the target account.

For example, in a game scene, parts of a game character appearance may include a face, a body, and four limbs. When the target part includes the face only, sub-parts of the face are encapsulated and combined first, and the body and the four limbs are set as default parts in a game system, or the body and the four limbs are set by the user, and finally, the face, the body, and the four limbs are encapsulated and combined to generate the game character appearance (having the same function as the target virtual operating object). The foregoing description is merely an example, and is not limited herein.

In one embodiment, in a case that the target part includes a plurality of parts, the plurality of parts are encapsulated and combined in different manners described above, to generate the target virtual operating object, thereby improving the diversity of setting manners of the target virtual operating object, and improving the gaming experience of a user.

In an embodiment, after the target part is generated in the target game application according to the target feature parameter, the method may further include: encapsulating and combining, in a case that the target part includes one part and the one part and a collaborative part different from the one part jointly form all parts that are required for generating the target virtual operating object, the one generated part (that is, the target part) and the collaborative part to obtain the target virtual operating object, the collaborative part being a part at a default position in the target game application, or a part generated according to a feature parameter inputted by a target account.

In an embodiment, when the target part includes only one part, the one part and the collaborative part (any necessary part other than the one part for forming the target virtual operating object) are encapsulated and combined together to form the target virtual operating object. The collaborative part may be set as a default part in the target game application, or the collaborative part may be set through a manual input of a user corresponding to the target account. The foregoing description is merely an example, and is not limited herein.

In one embodiment, in a case that the target part includes one part, by encapsulating and combining the one part and the collaborative part to generate the target virtual operating object, the target virtual operating object can be set effectively, improving the gaming experience of the user.

Figure 4:
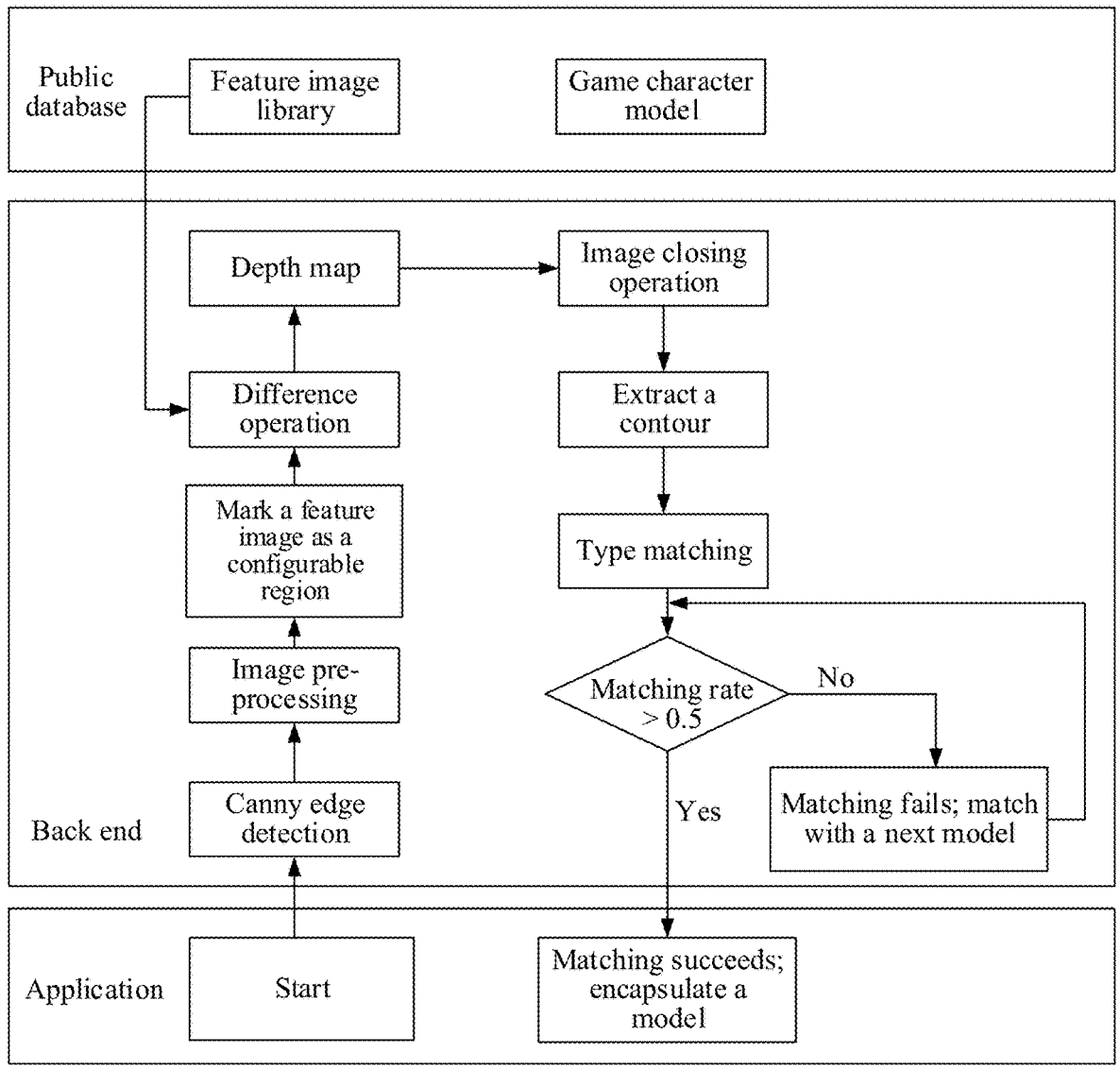
FIG. 4 is a schematic flowchart of a method for determining a game character appearance according to an embodiment of the present disclosure.

A method for determining a game character appearance is described in the following with reference to FIG. 4. As shown in FIG. 4, the method may include the followings.

S1: A player uploads picture material (e.g., workable-picture).

When the player uploads the picture material (for example, a face picture), a server or a terminal device may check the specifications of the picture material uploaded by the player and checks whether value ranges of the specifications of the picture material conform to basic criteria. If not, it is necessary to inform the player to upload picture material again. For example, the user may be informed, through a text, speech, or picture, to upload the picture material again. The foregoing description is merely an example, and is not limited herein.

S2: Perform image processing on the picture material.

Edge detection and image pre-processing are performed on the obtained picture material to mark a feature image in the picture material image as a configurable region. A difference operation is then performed on the feature image to obtain a depth map after the difference operation, a closing operation is performed next on the depth map and a feature region of the depth map after the closing operation is split, and a contour value of the feature region is marked for the feature region to obtain contour information of the picture material (for example, the face picture).

S3: Match a public feature image library with a game character model library, and determine part information.

The public feature image library stores features of face pictures, and the game character model library stores features of game characters. The contour information of the face picture is matched with features of models in the game character model library one by one, to determine part information corresponding to the face picture. The foregoing description is merely an example, and is not limited herein.

S4: Synchronize the part information of the face picture into the character model library for retrieval.

The part information of the face picture is retrieved in the character model library to improve a matching degree between the part information of the face picture and features in the character model library.

S5: Synchronize, at the same time, a contour value marked after operation into the character model library for determining and matching processing.

The contour information of the face picture is matched with features of models in the game character model library. If a matching degree between the contour information of the face picture and a feature of a model in the game character model library exceeds a matching rate (for example, 0.5), the match succeeds.

A sequence of processing steps S4 and S5 is not limited. For example, S4 and S5 can be processed simultaneously.

S6: Retrieve a maximum result value preferably from the model library if there are results determined in a matching value range, or retrieve a default value from the model library if there is no result determined in the matching value range.

When a plurality of values are obtained after the matching between the face picture and the features in the character model library, a maximum value is selected as the matching result, or if the matching result cannot be obtained in the matching range, a default value is selected as the matching result.

A method for determining a game character appearance through facial recognition is described in the following with reference to FIG. 5.

Figure 5:
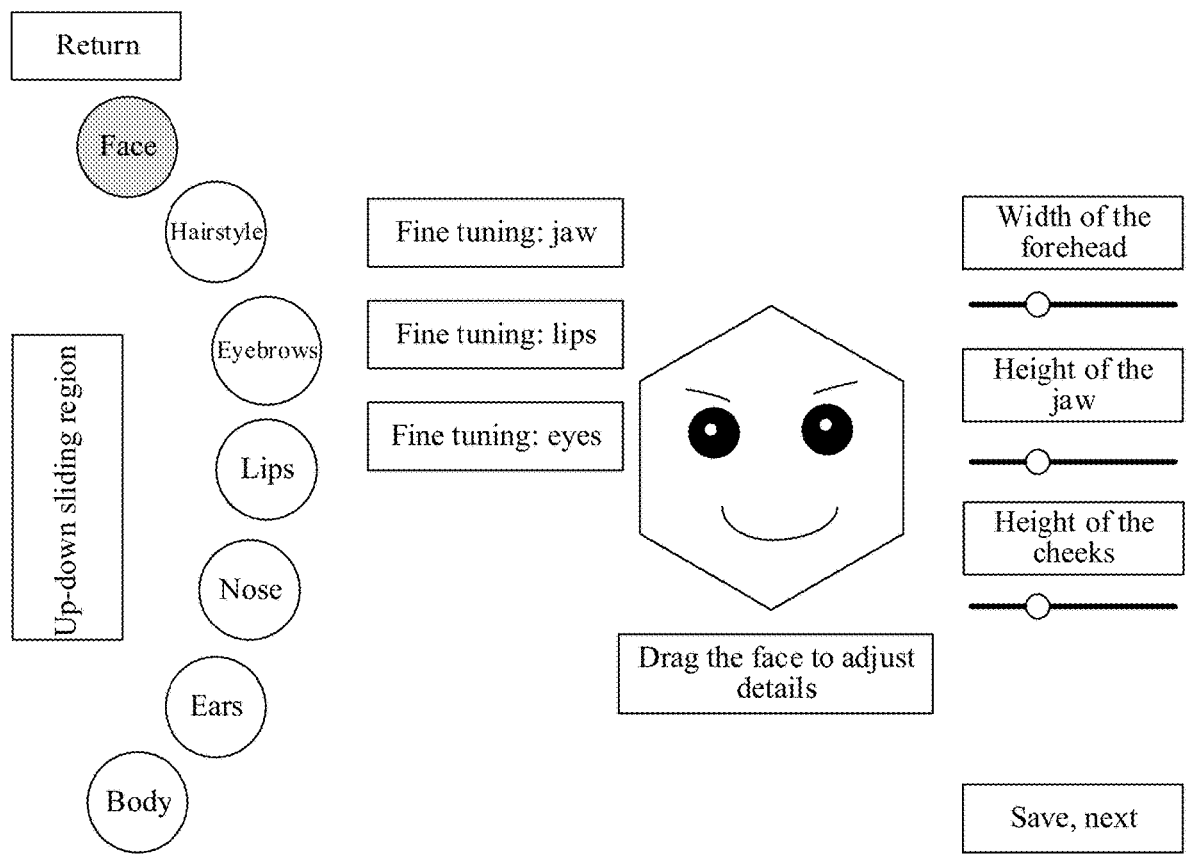
FIG. 5 is a schematic diagram of manually setting a game character appearance in the related art.

As shown in FIG. 5, in the related art, a game player may manually set a game character appearance. An example of adjusting a face appearance is used. The game player can adjust a face appearance of a game character to be an appearance that the player is interested in through options shown on a game interface. However, for manual adjustment of contours, model quantity, and color quantity of character models, the infeasibility of manually presetting a massive number of model options on an interface, a complex interaction manner and complex naming raise the bar for a game player to enter a game.

Figure 6:
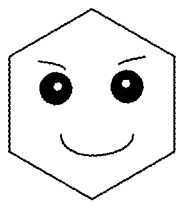
FIG. 6 is a schematic diagram of a method for determining a game character appearance through facial recognition according to an embodiment of the present disclosure.
Figure 6:
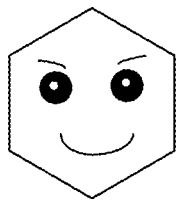
Figure 6:
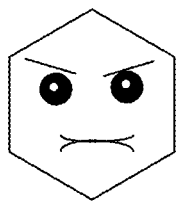
Figure 6:
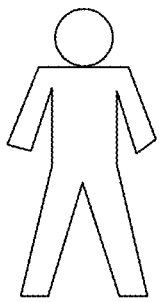

In an embodiment, to resolve the foregoing problem, a method for determining a game character appearance through facial recognition is provided. As shown in FIG. 6, a game player may enter creation based on facial recognition by selecting an option on a game interface. Through the function of creation based on facial recognition, after the player uploads a picture, for example, a face picture that is photographed by a mobile device or selected from a picture gallery, the face is aligned with a preset mode according to coordinates of facial key points. Then, features of the face picture of the player are calculated. Next, the features of the face picture are matched with corresponding information coordinates in a character model feature database (having the same function as the feature image library), and are further matched with features in the character model feature database. Result information for each feature of the face picture is obtained from the character model feature database through matching.

Figure 7:
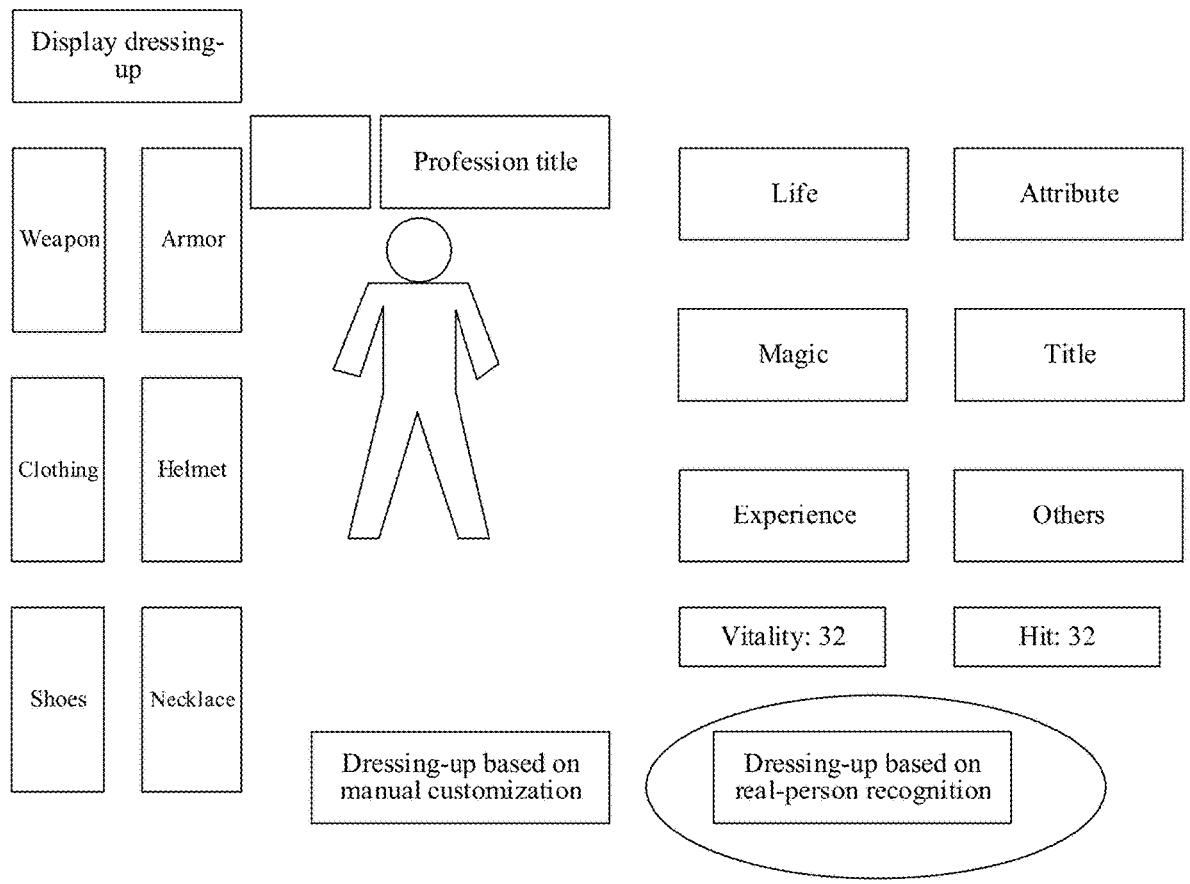
FIG. 7 is a schematic diagram of another method for determining a game character appearance through facial recognition according to an embodiment of the present disclosure.

In an embodiment, to resolve the foregoing problem, another method for determining a game character appearance through facial recognition is provided. As shown in FIG. 7, a game player may create a game character appearance by using a fixed setting and/or manual adjustment in combination with a manner of creation based on facial recognition. For example, most players chasing for individuality, after creating a game character appearance in a conventional creation manner, may further select dressing-up based on real-person recognition in some game scenes where social interaction is needed. The player uploads information about facial material and modifies the face and head portrait of a game character through facial recognition. Therefore, the character appearance of the game player can be quickly modified.

Figure 8:
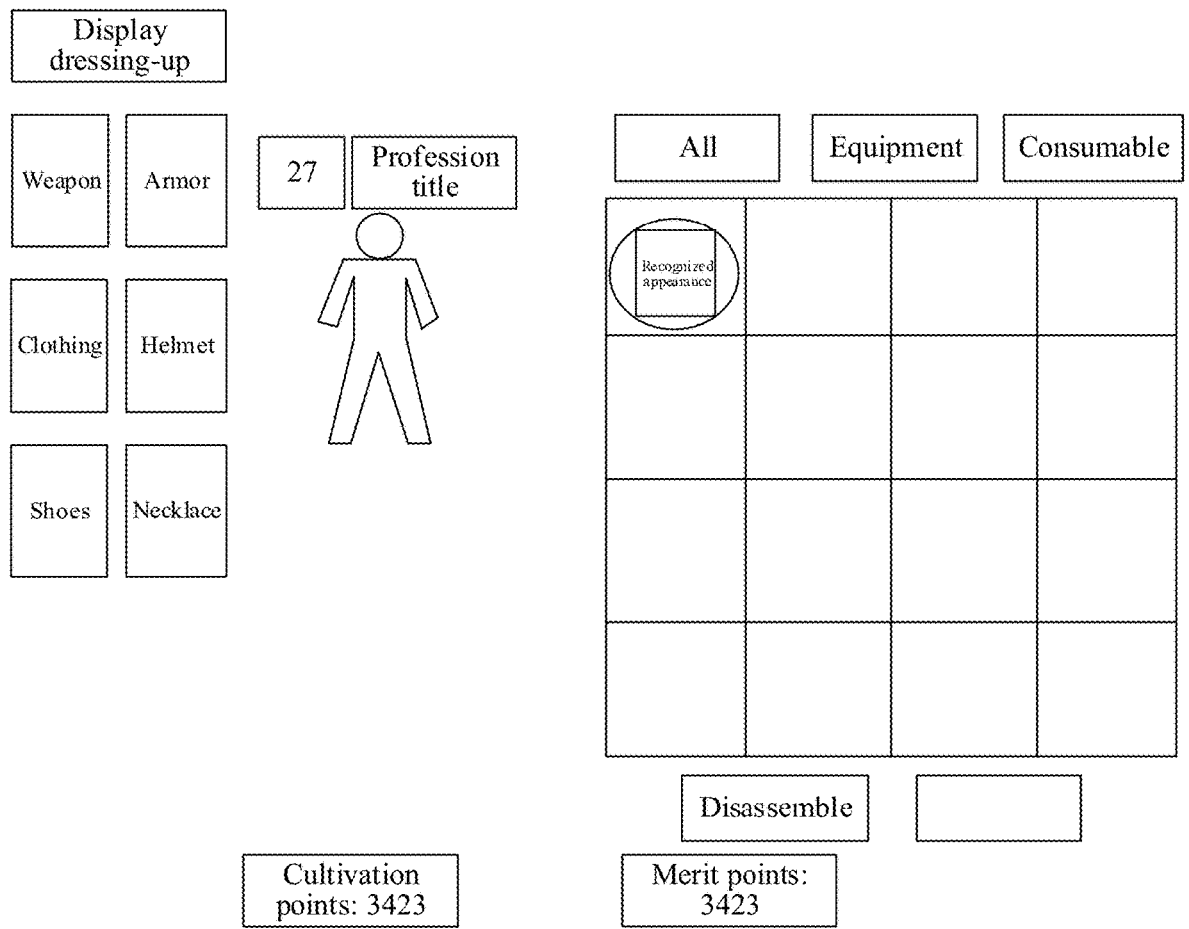
FIG. 8 is a schematic diagram of still another method for determining a game character appearance through facial recognition according to an embodiment of the present disclosure.

In an embodiment, to resolve the foregoing problem, still another method for determining a game character appearance through facial recognition is provided. As shown in FIG. 8, a game player may start a facial recognition dressing-up function according to a prop or a task in a game, to further change a game character appearance of the player.

In the manner of creation based on facial recognition, a gender, a virtual contour, a model, and a color can be quickly and easily selected for a game player according to body information and facial information in a face picture. In the manner of creating a game character appearance through the function of creation based on facial recognition, the problem of homogenization of game character appearances is effectively resolved, and the degree of complexity of manual operation and setting by a game player.

In one embodiment, the manner of creation based on facial recognition satisfies an ordinary player, a professional player, or a player chasing for individuality in game design, increases the length of the life cycle of a game product and improves the playability of the game product, and further simplifies edition iteration of individualized skins. In addition, the highly flexible customization of a game character appearance not only brings more interesting and individualized experience to the game, but also reduces the operating difficulty of a player.

To make the description simple, the foregoing method embodiments are stated as a series of action combinations. However, a person skilled in the art needs to know that the present disclosure is not limited to the described sequence of the actions. Some steps may use another sequence or may be simultaneously performed. In addition, a person skilled in the art shall also know that all the embodiments described in the present disclosure are exemplary embodiments, and the related actions and modules are not necessarily mandatory to the present disclosure.

Figure 9:
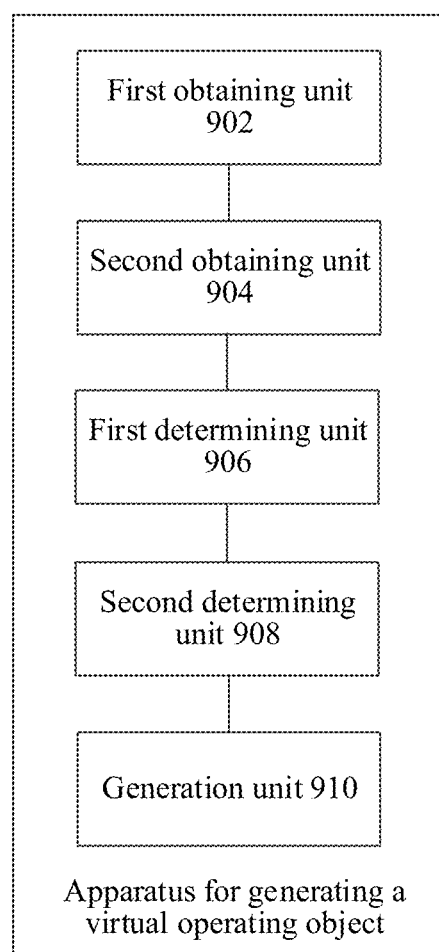
FIG. 9 is a schematic structural diagram of an apparatus for generating a virtual operating object according to an embodiment of the present disclosure.

According to still another aspect of the present disclosure, an apparatus for generating a virtual operating object is further provided. As shown in FIG. 9, the apparatus includes: a first obtaining unit 902, a second obtaining unit 904, a first determining unit 906, a second determining unit 908, and a generation unit 910.

The first obtaining unit 902 is configured to obtain a target portrait picture on a configuration interface of a target game application. The second obtaining unit 904 is configured to obtain a first picture region of the target portrait picture where a first part presents and a first part feature of the first part according to the target portrait picture.

The first determining unit 906 is configured to determine a target part matching the first picture region in a pre-established feature image library, the target part being a part of a to-be-generated target virtual operating object in the target game application. The second determining unit 908 is configured to determine, in a value range of a target part feature of the target part pre-recorded in the feature image library, a target feature parameter, which matches the first part feature, of the target part feature. The generation unit 910 is configured to generate the target part in the target game application according to the target feature parameter.

In an embodiment, the method for generating a virtual operating object includes setting a game character appearance in a game scene through a client.

In an embodiment, the first obtaining unit 902 may be configured to perform S202, the second obtaining unit 904 may be configured to perform S204, the first obtaining unit 906 may be configured to perform S206, the second determining unit 908 may be configured to perform S208, and the generation unit 910 may be configured to perform S210.

In one embodiment, a target portrait picture is obtained on a configuration interface of a target game application; a first part of the target portrait picture, a first picture region of the first part, and a first part feature of the first part are obtained; a target part matching the first picture region is determined in a feature image library; a target feature parameter matching the first part feature is determined according to a value range of a target part feature of the target part in the feature image library; and finally, the target part is generated in the target game application according to the target feature parameter. Through this method, a target part in a target game application can be determined through a part of a face picture. Because the target part is a part of a game character appearance, the technical effect of quickly determining the game character appearance is achieved, thereby resolving the technical problems that game character appearances are homogeneous in the setting manner of game character appearances in the related art and steps of manually setting a game character appearance are complex.

In one embodiments, the second determining unit includes: a first determining module configured to determine, in a case that a plurality of feature values matching a feature value of the first part feature are found in the value range, a maximum value in the plurality of feature values as the target feature parameter.

In one embodiment, by determining the maximum value in the plurality of feature values matching the feature value of the first part feature as the target feature parameter, the accuracy of determining the target feature parameter is improved.

In a technical solution, the second determining unit includes:

(1) a second determining module, configured to determine, in a case that no feature value matching a feature value of the first part feature is found in the value range, a preset default value in the value range as the target feature parameter.

In one embodiment, in a case that no feature value matching the feature value of the first part feature is found in the value range, the preset default value in the value range is determined as the target feature parameter, to save time and time costs.

In one embodiment, the first determining unit includes: an obtaining module, and a third determining module.

The obtaining module is configured to obtain similarity between each part recorded in the feature image library and the first part shown in the first picture region; and the third determining module is configured to determine a part, similarity between which and the first part exceeds a preset threshold, in the feature image library as the target part.

In one embodiment, by determining a part, similarity between which and the first part exceeds a preset threshold, in the feature image library as the target part, the accuracy of determining the target part is improved.

In one embodiment, the second determining unit includes: a fourth determining module, configured to determine, in a case that the target part feature includes a plurality of part features, a feature value of each part feature in value ranges of the plurality of part features pre-recorded in the feature image library, the target feature parameter including the feature value of the each part feature.

In one embodiment, in a case that the target part includes a plurality of part features, a value range of the each part feature of the plurality of part features may be determined, to improve the accuracy of determining the target feature parameter.

In one embodiment, the apparatus further includes: a first processing unit, and a second processing unit.

The first processing unit is configured to encapsulate and combine, in a case that the target part includes a plurality of parts and the plurality of parts are all parts that are required for generating the target virtual operating object, the plurality of parts to obtain the target virtual operating object.

The second processing unit is configured to encapsulate and combine, in a case that the target part includes a plurality of parts and the plurality of parts and a collaborative part different from the plurality of parts jointly form all parts that are required for generating the target virtual operating object, the plurality of generated parts and the collaborative part to obtain the target virtual operating object, the collaborative part being a part at a default position in the target game application, or a part generated according to a feature parameter inputted by a target account.

In one embodiment, in a case that the target part includes a plurality of parts, the plurality of parts are encapsulated and combined in different manners described above, to generate the target virtual operating object, thereby improving the diversity of setting manners of the target virtual operating object, and improving the gaming experience of a user.

In one embodiment, the apparatus further includes a third processing unit. The third processing unit is configured to encapsulate and combine, in a case that the target part includes one part and the one part and a second group of parts different from the one part jointly form all parts that are required for generating the target virtual operating object, the generated one part and the second group of parts to obtain the target virtual operating object, the second group of parts being parts at default positions in the target game application, or parts generated according to a feature parameter inputted by a target account.

In one embodiment, in a case that the target part includes one part, by encapsulating and combining the one part and the second group of parts to generate the target virtual operating object, the target virtual operating object can be effectively set, improving the gaming experience of a user.

According to yet another aspect of the present disclosure, one or more computer-readable storage mediums are further provided. The storage medium stores computer-readable instructions, the computer-readable instructions, when run, being used for performing the steps in any one of the foregoing method embodiments.

In an embodiment, the storage medium may be configured to store computer-readable instructions used for performing the followings.

S1: Obtain a target portrait picture on a configuration interface of a target game application.

S2: Obtain a first picture region of the target portrait picture where a first part presents and a first part feature of the first part according to the target portrait picture.

S3: Determine a target part matching the first picture region in a pre-established feature image library, the target part being a part of a to-be-generated target virtual operating object in the target game application.

S4: Determine, in a value range of a target part feature of the target part pre-recorded in the feature image library, a target feature parameter, which matches the first part feature, of the target part feature.

S5: Generate the target part in the target game application according to the target feature parameter.

In an embodiment, a person of ordinary skill in the art can understand that all or some of the steps of the methods in the foregoing embodiments can be implemented by computer-readable instructions instructing relevant hardware of a terminal device. The computer-readable instructions may be stored in a computer-readable storage medium, and the storage medium may include a flash drive, a read-only memory (ROM), a random access memory (RAM), a magnetic disk, a compact disc, and the like.

Figure 10:
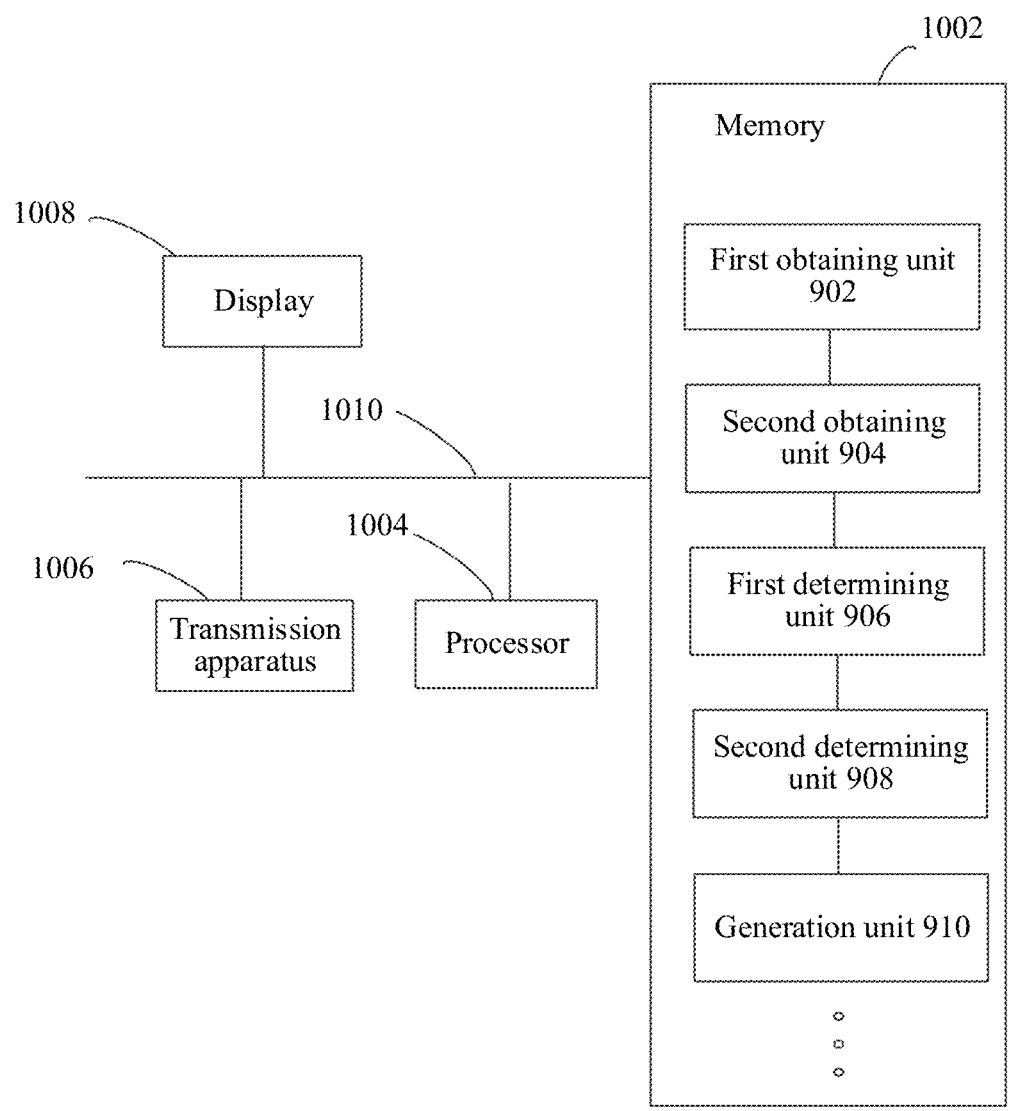
FIG. 10 is a schematic structural diagram of an electronic device according to an embodiment of the present disclosure.

According to yet another aspect of the embodiments of the present disclosure, an electronic device for implementing the foregoing method for generating a virtual operating object is further provided. As shown in FIG. 10, the electronic device includes a memory 1002 and a processor 1004. The memory 1002 stores computer-readable instructions, and the processor 1004 is configured to perform the operations in any one of the above method embodiments through the computer-readable instructions.

In an embodiment, the electronic device may be located in at least one of a plurality of network devices in a computer network.

In an embodiment, the processor may be configured to perform the following steps by using the computer-readable instructions:

S1: Obtain a target portrait picture on a configuration interface of a target game application.

S2: Obtain a first picture region of the target portrait picture where a first part presents and a first part feature of the first part according to the target portrait picture.

S3: Determine a target part matching the first picture region in a pre-established feature image library, the target part being a part of a to-be-generated target virtual operating object in the target game application.

S4: Determine, in a value range of a target part feature of the target part pre-recorded in the feature image library, a target feature parameter, which matches the first part feature, of the target part feature.

S5: Generate the target part in the target game application according to the target feature parameter.

In an embodiment, a person of ordinary skill in the art may understand that, the structure shown in FIG. 10 is only illustrative. The electronic device may be a terminal device such as a smartphone (for example, an Android phone, or an iOS phone), a tablet computer, a palmtop computer, a mobile Internet device (MID), or a PAD. FIG. 10 does not limit the structure of the electronic device. For example, the electronic device may further include more or fewer components (such as a network interface) than those shown in FIG. 10, or have a configuration different from that shown in FIG. 10.

The memory 1002 may be configured to store a software program and a module, for example, computer-readable instructions/modules corresponding to the method and apparatus for generating a virtual operating object in the embodiments of the present disclosure, and the processor 1004 performs various functional applications and data processing by running the software computer-readable instructions and modules stored in the memory 1002, that is, implementing the foregoing method for generating a virtual operating object. The memory 1002 may include a high-speed random memory, and may further include a non-volatile memory such as one or more magnetic storage apparatuses, a flash memory, or another non-volatile solid-state memory. In some embodiments, the memory 1002 may further include memories remotely disposed relative to the processor 1004, and the remote memories may be connected to a terminal through a network. An example of the network includes the Internet, an intranet, a local area network, a mobile communication network, and a combination thereof. The memory 1002 may be specifically configured to store, but not limited to, information such as sample feature of an object and a target virtual resource account. In an example, as shown in FIG. 10, the memory 1002 may include a first obtaining unit 902, a second obtaining unit 904, a first determining unit 906, a second determining unit 908, and a generation unit 910 in the foregoing apparatus for generating a virtual operating object. In addition, the memory may further include other modules or units in the foregoing apparatus for generating a virtual operating object, and details are not described in this example again.

In an embodiment, a transmission apparatus 1006 is configured to receive or transmit data through a network. Specific examples of the foregoing network may include a wired network and a wireless network. In an example, the transmission apparatus 1006 includes a network interface controller (NIC), and the NIC may be connected to another network device and a router via a network cable to communicate with the Internet or a local area network. In an example, the transmission apparatus 1006 is a radio frequency (RF) module, configured to communicate with the Internet in a wireless manner.

In addition, the electronic device further includes a display 1008, configured to show information; and a connection bus 1010, configured to connect various module components in the electronic device.

In other embodiments, the terminal or server may be a node in a distributed system. The distributed system may be a blockchain system. The blockchain system may be formed by a plurality of nodes that are connected through network communication. A peer to peer (P2P) network can be formed between nodes. Computing devices in any form, for example, a server, a terminal, or other electronic devices, may become nodes in the blockchain system by joining the P2P network.

In an embodiment, a person of ordinary skill in the art can understand that all or some of the steps of the methods in the foregoing embodiments can be implemented by computer-readable instructions instructing relevant hardware of a terminal device. The computer-readable instructions may be stored in a computer-readable storage medium, and the storage medium may include a flash drive, a ROM, a RAM, a magnetic disk, a compact disc, and the like.

In a case that the integrated unit in the foregoing embodiments is implemented in the form of a software function unit and sold or used as an independent product, the integrated unit can be stored in the foregoing computer-readable storage medium. Based on such an understanding, the technical solution of the present disclosure essentially, or a part contributing to the related art, or all or a part of the technical solution may be implemented in a form of a software product. The computer software product is stored in a storage medium and includes several instructions for instructing one or more computer devices (which may be a PC, a server, a network device or the like) to perform all or some of steps of the methods in the embodiments of the present disclosure.

In the foregoing embodiments of the present disclosure, descriptions of the embodiments have different emphases. As for parts that are not described in detail in one embodiment, reference may be made to the relevant descriptions of the other embodiments.

In the several embodiments provided in the present disclosure, it is to be understood that the disclosed client may be implemented in other manners. The described apparatus embodiment is merely exemplary. For example, the unit division is merely logical function division and may be other division during actual implementation. For example, a plurality of units or components may be combined or integrated into another system, or some features may be ignored or not performed. In addition, the coupling, or direct coupling, or communication connection between the displayed or discussed components can be the indirect coupling or communication connection through some interfaces, units, or modules, and can be in electrical or other forms.

The units described as separate components may or may not be physically separate, and components displayed as units may or may not be physical units, may be located in one position, or may be distributed on a plurality of network units. Some or all of the units may be selected according to actual requirements to achieve the objectives of the solutions of the embodiments.

In addition, functional units in the embodiments of the present disclosure may be integrated into one processing unit, or each of the units may exist alone physically, or two or more units are integrated into one unit. The integrated unit may be implemented in the form of hardware, or may be implemented in the form of a software function unit.

The foregoing descriptions are exemplary implementations of the present disclosure. A person of ordinary skill in the art may make several improvements and refinements without departing from the principle of the present disclosure, and the improvements and refinements shall fall within the protection scope of the present disclosure.

What is claimed is:

1. A method for generating a virtual operating object, comprising:
    obtaining a target portrait picture of a user on a configuration interface of setting an appearance of a virtual character in a target application on an electronic device;
    obtaining a first picture region of the target portrait picture where a first part presents and a first part feature of the first part, the first part being a body or face part of the user;
    determining a target part matching the first picture region in a pre-established feature image library, the target part being a body or face part of the virtual character to be generated in the target application, including:
        respectively obtaining similarities between candidate model parts and the first part, the candidate model parts being different body or face parts recorded in the feature image library; and
        determining a candidate model part, similarity between which and the first part exceeds a preset threshold, in the feature image library to obtain the target part;
    determining a target feature parameter matching the first part feature in a value range of a target part feature of the target part pre-recorded in the feature image library; and
    generating the target part of the virtual character in the target application according to the target feature parameter.

2. The method according to claim 1, wherein the determining a target feature parameter matching the first part feature in a value range of a target part feature of the target part pre-recorded in the feature image library comprises:
    determining, when a plurality of feature values matching a feature value of the first part feature are found in the value range, a maximum value in the plurality of feature values as the target feature parameter.

3. The method according to claim 1, wherein the determining a target feature parameter matching the first part feature in a value range of a target part feature of the target part pre-recorded in the feature image library comprises:
    determining, when no feature value matching a feature value of the first part feature is found in the value range, a preset default value in the value range as the target feature parameter.

4. The method according to claim 1, wherein the determining a target feature parameter matching the first part feature in a value range of a target part feature of the target part pre-recorded in the feature image library comprises:
    determining, when the target part feature comprises a plurality of part features, a feature value of each part feature in value ranges of the plurality of part features pre-recorded in the feature image library, the target feature parameter comprising the feature value of the each part feature.

5. The method according to claim 1, further comprising:
    encapsulating and combining, when the target part comprises a plurality of parts and the plurality of parts are all required for generating the virtual character, the plurality of parts to obtain the virtual character.

6. The method according to claim 1, further comprising: encapsulating and combining the generated target part and a collaborative part to obtain the virtual character when the target part is a partial part used for generating the virtual character, wherein the collaborative part is a part used for forming the virtual character together with the target part, the collaborative part is a part at a default position in the target application, or the collaborative part is a part generated according to a feature parameter inputted by a target account.

7. The method according to claim 1, wherein the configuration interface including a manual customization option and a real-person recognition option;
the target portrait picture is obtained in response to the real-person recognition option being triggered.

8. The method according to claim 7, further comprising: generating a first appearance of the virtual character in response to the manual customization option being triggered;
determining one of the first appearance and the second appearance as a target appearance of the virtual character in game scenes according to a user selection, and saving the other one of the first appearance and the second appearance as a stored appearance; and
executing the game scenes using the target appearance of the virtual character for game playing.

9. The method according to claim 8, further comprising: during the game playing, initiating a dress-up interface from one of the game scenes in response to a game prop or a game task being triggered;
displaying an appearance icon in the dress-up interface as one of the game props available to be used on the virtual character;
switching from the target appearance to the stored appearance for the virtual character in response to a single trigger of the appearance icon; and
continuing the game playing using the stored appearance of the virtual character.

10. An electronic device, comprising:
a memory storing computer program instructions; and
a processor coupled to the memory and, when executing the computer program instructions, configured to perform:
obtaining a target portrait picture of a user on a configuration interface of setting an appearance of a virtual character in a target application on an electronic device;
obtaining a first picture region of the target portrait picture where a first part presents and a first part feature of the first part, the first part being a body or face part of the user;
determining a target part matching the first picture region in a pre-established feature image library, the target part being a body or face part of the virtual character to be generated in the target application, including:
respectively obtaining similarities between candidate model parts and the first part, the candidate model parts being different body or face parts recorded in the feature image library; and
determining a candidate model part, similarity between which and the first part exceeds a preset threshold, in the feature image library to obtain the target part;
determining a target feature parameter matching the first part feature in a value range of a target part feature of the target part pre-recorded in the feature image library; and generating the target part of the virtual character in the target application according to the target feature parameter.

11. The electronic device according to claim 10, wherein the determining a target feature parameter matching the first part feature in a value range of a target part feature of the target part pre-recorded in the feature image library comprises:
determining, when a plurality of feature values matching a feature value of the first part feature are found in the value range, a maximum value in the plurality of feature values as the target feature parameter.

12. The electronic device according to claim 10, wherein the determining a target feature parameter matching the first part feature in a value range of a target part feature of the target part pre-recorded in the feature image library comprises:
determining, when no feature value matching a feature value of the first part feature is found in the value range, a preset default value in the value range as the target feature parameter.

13. The electronic device according to claim 10, wherein the determining a target feature parameter matching the first part feature in a value range of a target part feature of the target part pre-recorded in the feature image library comprises:
determining, when the target part feature comprises a plurality of part features, a feature value of each part feature in value ranges of the plurality of part features pre- recorded in the feature image library, the target feature parameter comprising the feature value of the each part feature.

14. The electronic device according to claim 10, wherein the processor is further configured to perform:
encapsulating and combining, when the target part comprises a plurality of parts and the plurality of parts are all parts that are required for generating the virtual character, the plurality of parts to obtain the virtual character.

15. The electronic device according to claim 10, wherein the processor is further configured to perform:
encapsulating and combining the generated target part and a collaborative part to obtain the virtual character when the target part is a partial part used for generating the virtual character, wherein the collaborative part is a part used for forming the virtual character together with the target part, the collaborative part is a part at a default position in the target application, or the collaborative part is a part generated according to a feature parameter inputted by a target account.

16. A non-transitory computer-readable storage medium storing computer program instructions executable by at least one processor to perform:
obtaining a target portrait picture of a user on a configuration interface of setting an appearance of a virtual character in a target application on an electronic device;
obtaining a first picture region of the target portrait picture where a first part presents and a first part feature of the first part, the first part being a body or face part of the user;
determining a target part matching the first picture region in a pre-established feature image library, the target part being a body or face part of the virtual character to be generated in the target application, including:
respectively obtaining similarities between candidate model parts and the first part, the candidate model parts being different body or face parts recorded in the feature image library; and determining a candidate model part, similarity between which and the first part exceeds a preset threshold, in the feature image library to obtain the target part;

determining a target feature parameter matching the first part feature in a value range of a target part feature of the target part pre-recorded in the feature image library; and generating the target part of the virtual character in the target application according to the target feature parameter.

17. The non-transitory computer-readable storage medium according to claim 16, wherein the determining a target feature parameter matching the first part feature in a value range of a target part feature of the target part pre-recorded in the feature image library comprises:

determining, when a plurality of feature values matching a feature value of the first part feature are found in the value range, a maximum value in the plurality of feature values as the target feature parameter.

18. The non-transitory computer-readable storage medium according to claim 16, wherein the determining a target feature parameter matching the first part feature in a value range of a target part feature of the target part pre-recorded in the feature image library comprises:

determining, when no feature value matching a feature value of the first part feature is found in the value range, a preset default value in the value range as the target feature parameter.

19. The non-transitory computer-readable storage medium according to claim 16, wherein the determining a target feature parameter matching the first part feature in a value range of a target part feature of the target part pre-recorded in the feature image library comprises:

determining, when the target part feature comprises a plurality of part features, a feature value of each part feature in value ranges of the plurality of part features pre-recorded in the feature image library, the target feature parameter comprising the feature value of the each part feature.

20. The non-transitory computer-readable storage medium according to claim 16, wherein the processor further performs:

encapsulating and combining, when the target part comprises a plurality of parts and the plurality of parts are all parts that are required for generating the virtual character, the plurality of parts to obtain the virtual character.

* * * * *